United States Patent
Vellanki et al.

(10) Patent No.: US 7,430,739 B2
(45) Date of Patent: Sep. 30, 2008

(54) PROVIDING TRAVEL LOG INTEGRATION FOR OBJECTS HOSTED IN A BROWSER

(75) Inventors: Kusuma P. Vellanki, Portland, WA (US); Sujal S. Parikh, Redmond, WA (US); Lauren B. Lavoie, Seattle, WA (US); Shankar Ganesh, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 542 days.

(21) Appl. No.: 11/117,766

(22) Filed: Apr. 27, 2005

(65) Prior Publication Data

US 2006/0248444 A1 Nov. 2, 2006

(51) Int. Cl.
*G06F 9/46* (2006.01)
*G06F 15/16* (2006.01)

(52) U.S. Cl. ...................... 718/100; 709/227
(58) Field of Classification Search ................. 719/320; 718/100; 715/854, 205; 709/227
See application file for complete search history.

(56) References Cited

U.S. PATENT DOCUMENTS

2002/0095474 A1* 7/2002 Boys .......................... 709/217
2002/0103824 A1* 8/2002 Koppolu et al. .......... 707/501.1
2003/0066031 A1   4/2003 Laane
2005/0132296 A1* 6/2005 Milic-Frayling et al. .... 715/745
2006/0085766 A1* 4/2006 Dominowska et al. ...... 715/854

OTHER PUBLICATIONS

Quan, Dennis et al, How to Make a Semantic Web Browser, Proceedings of the 13th Annual Conference on WWW, New York, NY, May 2004, p. 255-265.*

* cited by examiner

*Primary Examiner*—Meng-Ai An
*Assistant Examiner*—Eric C Wai
(74) *Attorney, Agent, or Firm*—Workman Nydegger

(57) ABSTRACT

Described is a method and system by which document servers/applications (document objects) hosted by the browser may integrate with the browser's travel log. As a result, the user can use browser navigation commands, particularly forward and back commands, as well as a drop-down list of entries, to navigate among a hosted document's pages. Integration also allows the document object to add travel entries, persist relevant state, delete travel entries and update existing travel entries with new state. The browser and document object may communicate to update the browser's address bar, and to communicate various navigation events to keep each other synchronized. In one implementation, the browser limits navigation to top-level travel entries and the sub-navigation entries of the currently hosted document object, by filtering out sub-navigation entries that do not correspond to the currently-hosted document object. Frames no longer valid are also filtered from those available for navigation.

24 Claims, 8 Drawing Sheets

PROVIDING TRAVEL LOG INTEGRATION FOR OBJECTS HOSTED IN A BROWSER

FIELD OF THE INVENTION

The invention relates generally to computer systems, and more particularly to navigation in documents hosted in browsers.

BACKGROUND

Contemporary web browsers allow a user to visit different websites and different pages within a website or web application. The user can navigate back and forward between the pages in the order in which they were visited, using the browser's back and forward buttons or similar user interface, which may include special mouse buttons. Microsoft Corporation's Internet Explorer is one such browser that allows a back and forth navigation between different web pages; to this end, Internet Explorer maintains a travel log (TravelLog) comprising a navigation stack that maintains a list of recently visited sites.

In addition to viewing HTML-based web pages, Internet Explorer also has the ability to host different types of content inline, e.g. Microsoft® Office documents, .pdf documents, and so forth. In general, to host another document, a document object, or DocObj, is used as the container that contains the content, and the object communicates with the browser through defined interfaces. For Internet Explorer, COM (component object model) technology is used, and provides the container specification.

With respect to navigation between pages in the same hosted document, however, the user experience is limited and not consistent with HTML page navigation. For example, when navigating via document bookmarks or among pages (slides) in a presentation (e.g., Microsoft® PowerPoint) document, when a user actuates the browser's Back button, the user expects to go back to a previous page in the document. However, instead of navigating to the previous page in the same document, the browser navigates back to the previous web page. As a result, document servers often provide their own interfaces (e.g., in a separate toolbar of icons) for going back and forth between the pages in the document.

While this internal toolbar solution works to an extent, it does not overcome the inconsistent and unexpected results that occur when users (often out of habit) use the browser navigation commands when the browser is hosting a document object. What is needed is a seamless way to navigate to pages within hosted document objects, including via a browser's Back and Forward commands, to match users' expectations and provide users with a consistent navigation experience.

SUMMARY OF THE INVENTION

Briefly, the present invention is directed towards a method and system by which a browser-hosted document object may integrate with the browser's travel log (navigation stack), so that the user has a navigation experience that is consistent between web pages and within various types of documents. To this end, interfaces are provided by which document objects may add sub-navigation travel entries to the browser's travel log. The browser limits navigation to top-level travel entries and the sub-navigation entries of the currently hosted document object. As a result, the user can use browser navigation commands, particularly forward and back commands, as well as a drop-down list of entries, to navigate among a hosted document's pages.

In one implementation, the browser and document control comprise COM objects that implement interfaces used for travel log integration. Integration includes allowing the document object to add travel entries, and persist relevant state such as a URI, title (friendly name), a binary stream and so forth provided in a data structure. The document object specifies a unique identifier when adding an entry to distinguish different entries, such as a sub-navigation entry for each window/frame. The interfaces also allow a document server to delete travel entries and update existing travel entries with new state on a history navigation. The document object is able to control the travel entries to which the user can navigate based on the current context of the application, and may update the travel log on demand, e.g., based on application state changes.

For a consistent user experience, upon adding an entry or navigating to an entry, the document object may update the browser's address bar. The browser and hosted document object also communicate various navigation events to keep each other synchronized.

In one implementation, the browser limits the navigation to top-level travel entries and the sub-navigation entries of the currently hosted document object, by filtering out sub-navigation entries that do not correspond to the currently-hosted document object. This is done when rendering a dropdown list of entries, and when moving up or down the travel log navigation stack in response to a Back or Forward command. To this end, a unique document identifier (e.g., its CLSID) is maintained with each entry, and the current document object identifier matched against each entry. Top-level travel entries are allowed, along with those sub-navigation travel entries that match the document object. A query from the browser to the document object may make a secondary check on a given window identifier, so that frames no longer valid (e.g., removed via user action) are also filtered from those available for navigation.

When replaying a window, the browser returns the persisted state information to the document object for that window. The document object may asynchronously call the browser to update the state.

The present invention thus provides navigation between varied hosted document types/applications, and navigating within each document/application using a central user interface. This allows the user to seamlessly go back and forward within the application/document providing a consistent and expected browsing experience.

Other advantages will become apparent from the following detailed description when taken in conjunction with the drawings, in which:

DETAILED DESCRIPTION

Exemplary Operating Environment

Figure 1:
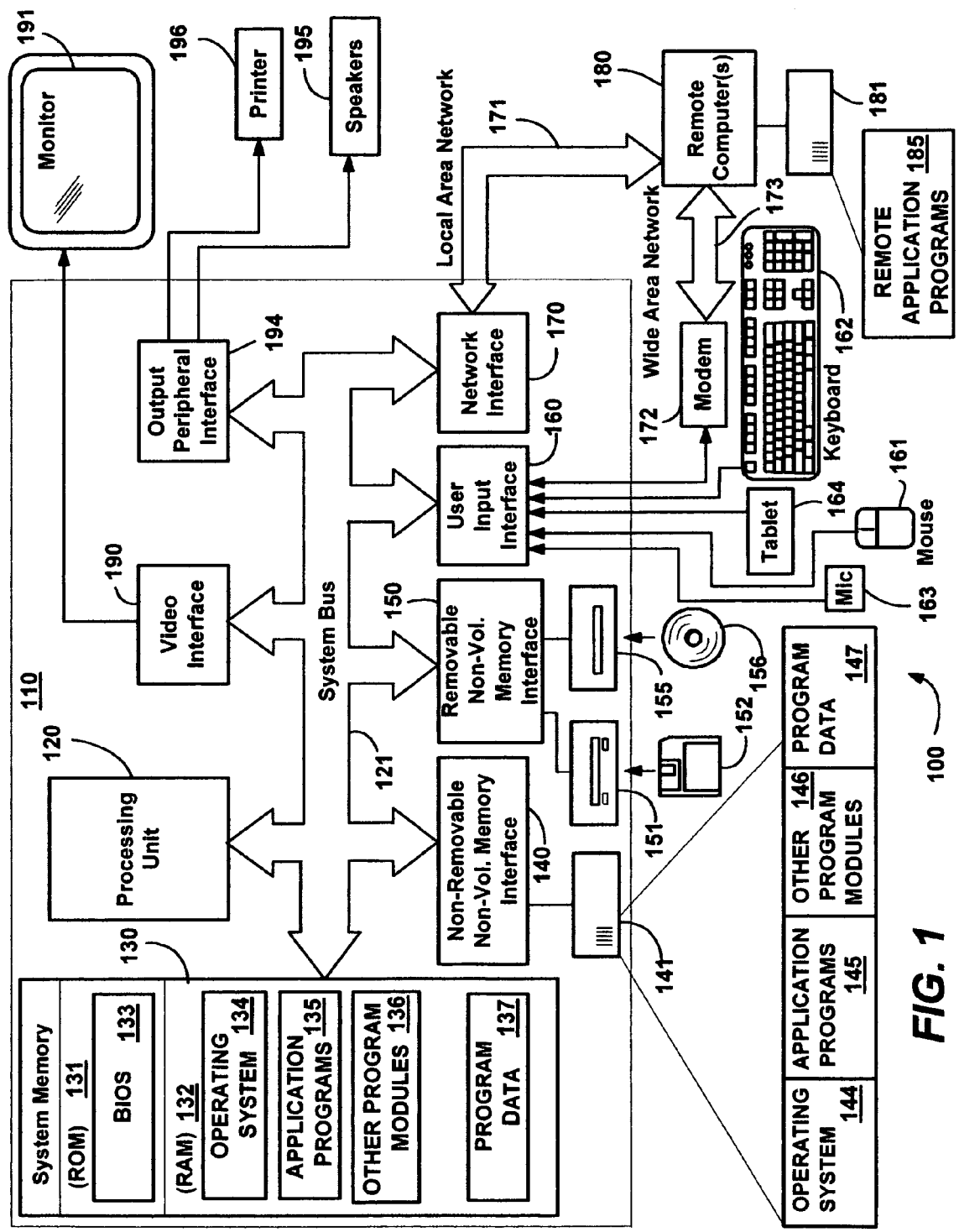
FIG. 1 is a block diagram generally representing a computing environment into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Travel Log Integration

The present invention is generally directed towards a method and system by which a document object communicates with a browser that is hosting it, for the purposes of adding entries into the navigation stack, or travel log. As a result, the user can use browser navigation commands, particularly forward and back commands, as well as a drop-down list of entries, to navigate among a document's pages. As will be understood, numerous ways to implement the present invention are feasible, and only some of the alternatives are described herein. For example, the present invention is primarily described with reference to Internet Explorer-based examples, however, it is feasible to implement the present invention into any program and/or component that has a navigation stack or the like for navigation. As such, the present invention is not limited to any particular examples used herein, but rather may be used various ways that provide benefits and advantages in computing in general.

Figure 2:
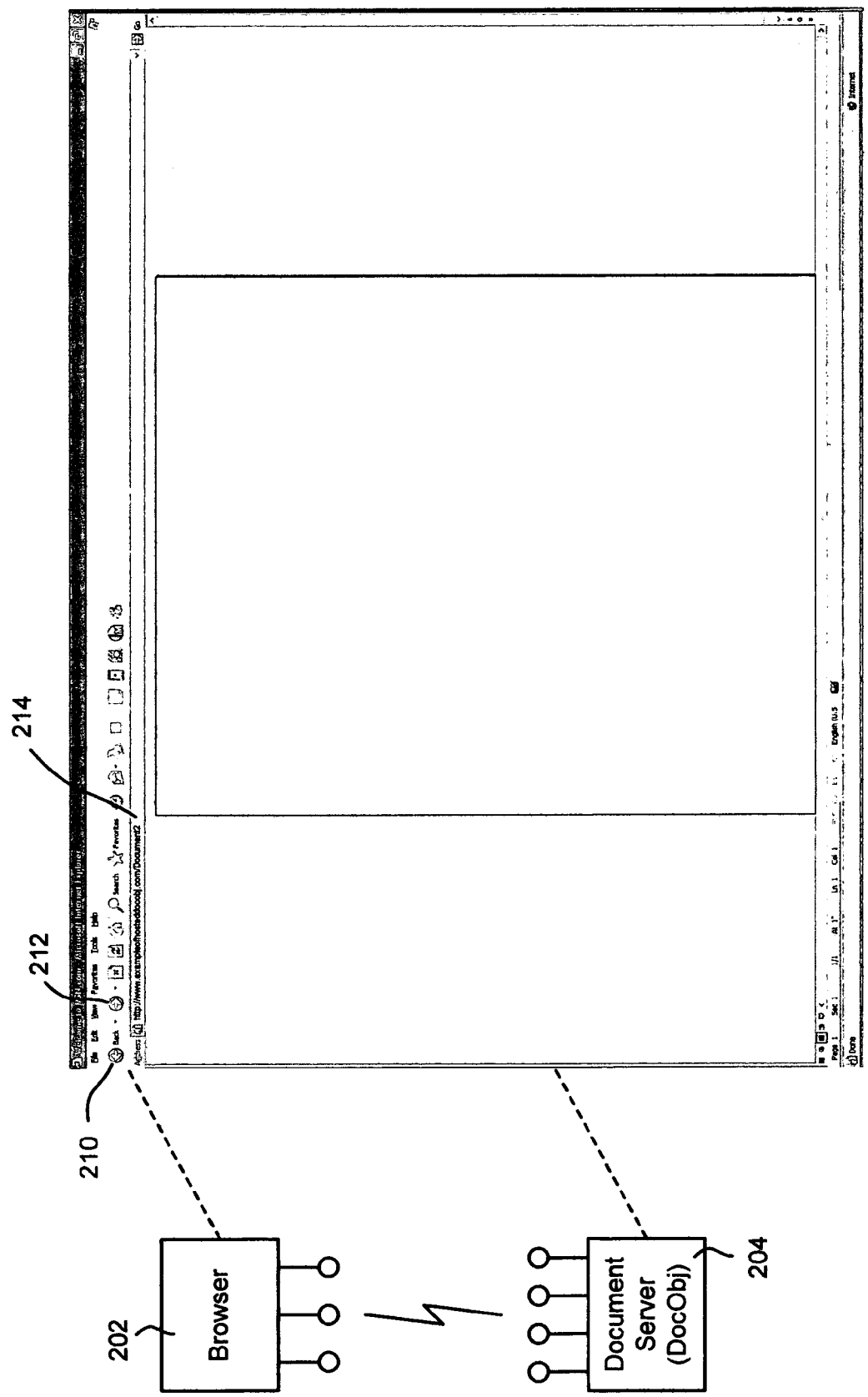
FIG. 2 is a representation of a browser and a document object hosted thereby, in accordance with various aspects of the present invention.

Turning to FIG. 2, there is shown a representation of a browser 202 hosting a document object (DocObj) 204, whereby when rendered, the document object 204 essentially appears as content within the browser window. Note that the term "document object" is used herein as the entity hosted in the browser 202, which can be an executable (exe) or a dynamic linked library (dll). Further note that although not shown in FIG. 2, the browser 202 itself may be a control being hosted in another program. Hosting a document object in a browser is well understood technology, and thus will not be described herein, except to note that in an Internet Explorer-based browser, the document object communicates with the browser control 202 via a set of predefined interfaces. In this example implementation, the components discover each other's interfaces via COM technology.

Figure 3:
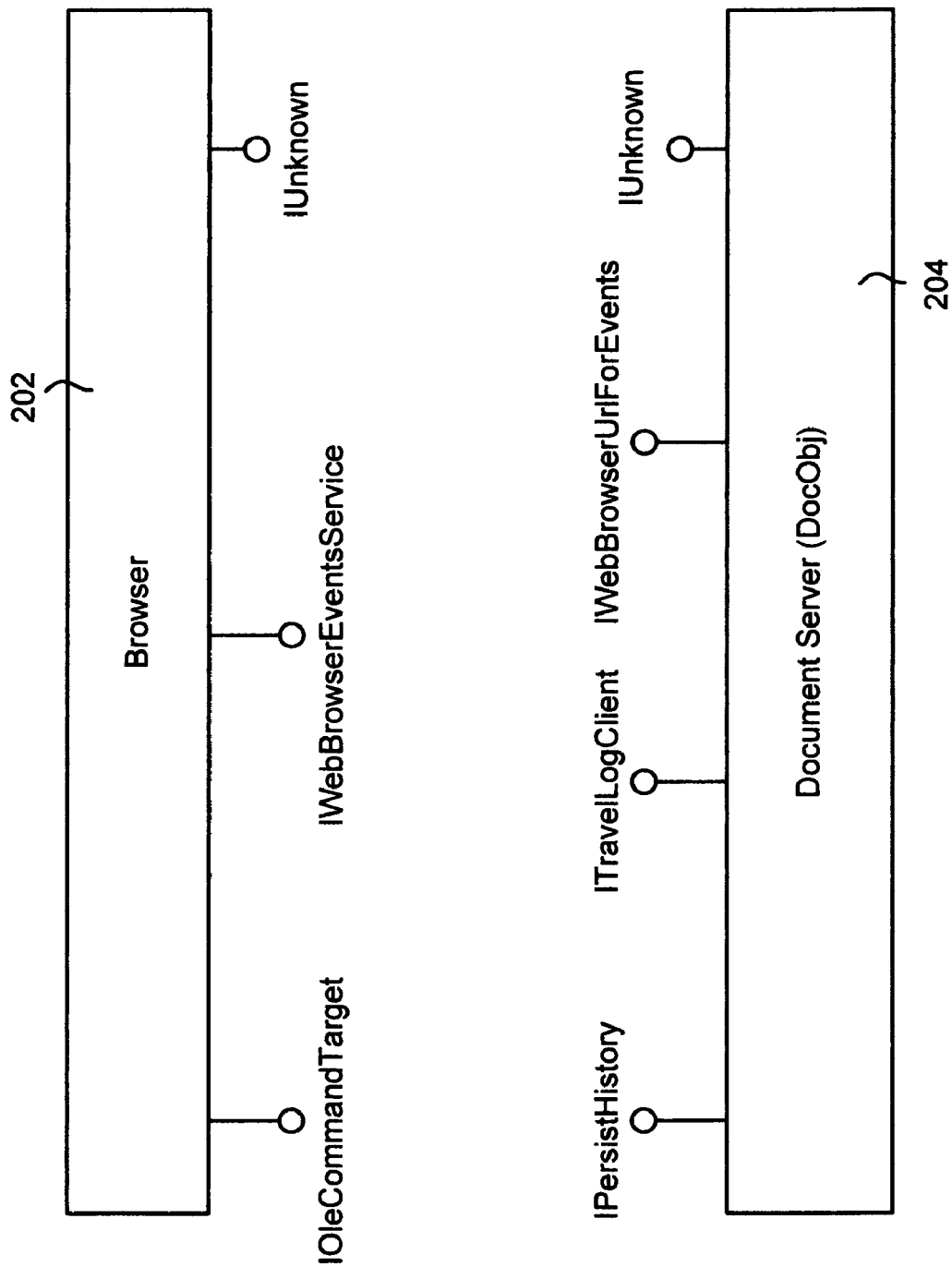
FIG. 3 is a block diagram representing example interfaces implemented by the browser and the document object for integrating with the browser travel log, in accordance with various aspects of the present invention.

In accordance with various aspects of the present invention, the browser 202 and document control 204 implement interfaces that are used for travel log integration. These interfaces are shown in more detail in FIG. 3, and include IWebBrowserEventsService in the browser 202, as set forth below:

```
STDMETHODIMP FireBeforeNavigate2(
    BOOL            fPlayNavSound,
    BOOL            * pfCancel);
STDMETHODIMP FireNavigateComplete2( );
STDMETHODIMP FireDownloadBegin( );
STDMETHODIMP FireDownloadComplete( );
STDMETHODIMP FireDocumentComplete( );
```

ITravelLogClient in the document server 204 is set forth below:

```
ITravelLogClient : public IUnknown
{
public:
    virtual HRESULT STDMETHODCALLTYPE FindWindowByIndex(
        /* [in] */ DWORD dwID,
        /* [out] */ IUnknown **ppunk) = 0;
    virtual HRESULT STDMETHODCALLTYPE GetWindowData(
        /* [out][in] */ LPSTREAM pStream,
        /* [out][in] */ LPWINDOWDATA pWinData) = 0;
    virtual HRESULT STDMETHODCALLTYPE
    LoadHistoryPosition(
        /* [in] */ LPOLESTR pszUrlLocation,
        /* [in] */ DWORD dwPosition) = 0;
};
```

In general, and as described below, the interfaces provide the hosted document object 204 with the ability to integrate with the browser's travel log 408. This includes allowing the document object 204 to add travel entries, and save relevant state such as a URI, title (friendly name), a binary stream and so forth. The document object 204 specifies a unique identifier when adding an entry to distinguish different entries.

The interfaces also allow a document server to delete travel entries and update existing travel entries with new state on a history navigation. The document object 204 is further able to filter the travel entries to which the user can navigate based on the current context of the application. Still further, the document object 204 may update the back/forward list on demand, e.g., based on application state changes.

Commands for adding and updating travel log entries include:

---

OLECMDID_ADDTRAVELENTRY
OLECMDID_UPDATETRAVELENTRY
OLECMDID_UPDATEADDRESSBAR

---

The document object 204 is also able to add top-level entries, provided enough information is stored in the entry to restore the application to the state represented in that entry. This allows any top-level navigations in an application to be visible, even if the document object 204 is not currently hosted.

Figure 4:
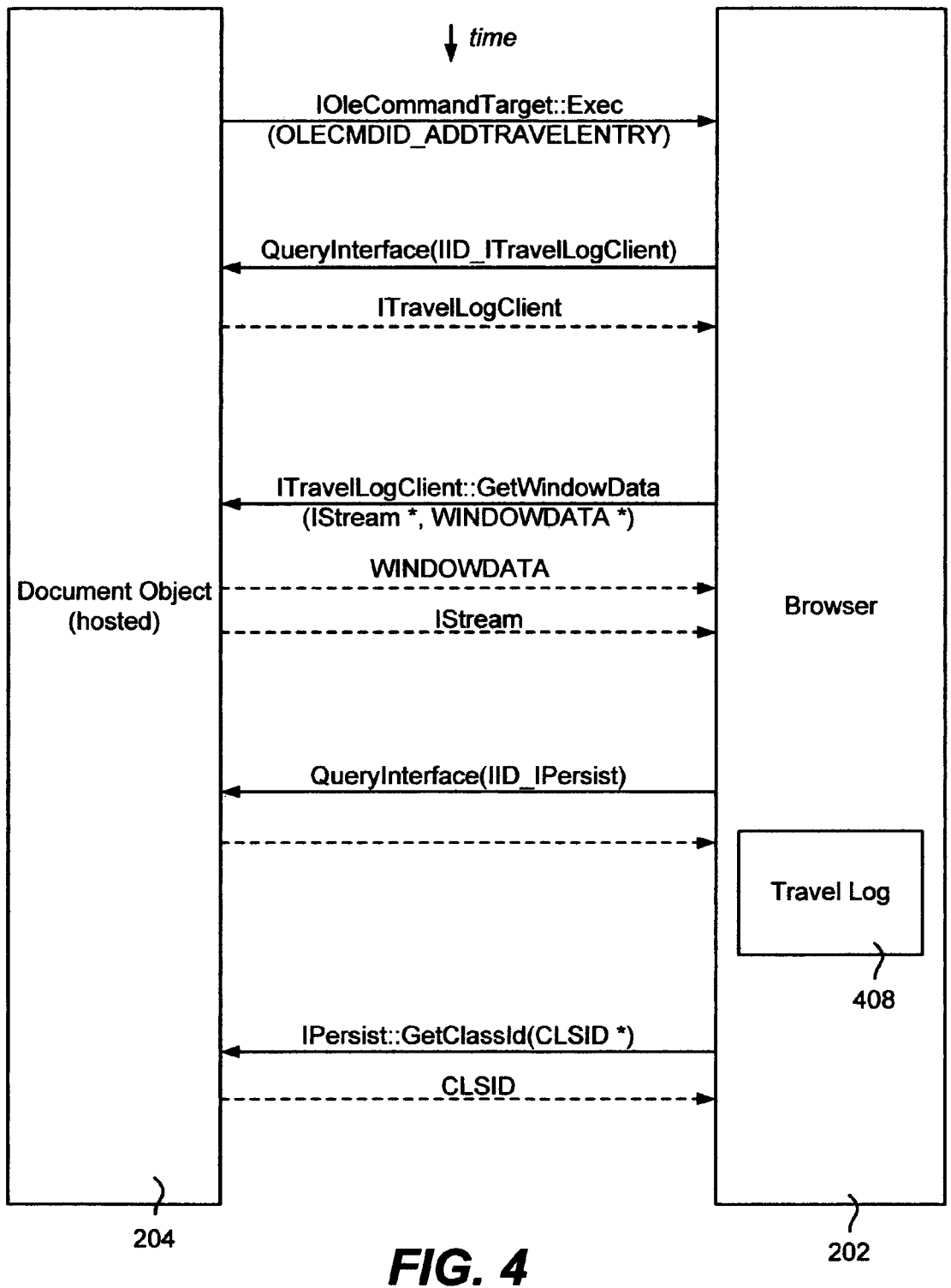
FIG. 4 is a sequence diagram representing communications between the browser and the hosted document object in an example implementation, by which the document object adds an entry to the browser travel log, in accordance with various aspects of the present invention.

FIG. 4 is a representation of an example sequence of calls that the hosted document object 204 and browser 202 communicate via the interfaces to add an entry into the browser's travel log 408. Note that in FIGS. 4-6, the dashed lines accompanying a call represent some optional or required communication back to the caller.

By way of example of adding a travel log entry, consider a user navigating to a "CarSelect" application hosted in the browser 202. In this example, the user may click on s "Choose a Car" selection to pick a model, e.g., Brand XX. The user may then choose different options such as Model X1, color, and so forth, and then may click a button of the application to save the current selection. Other examples include a presentation application placing references to its slides into the travel log in advance, whereby a user can use the browser 202 (and/or mouse) back and forth buttons 210, 212 respectively (FIG. 2) to view a slide show.

At any time, such as upon the save selection, the document server may call the API to add an entry into the browser's travel log 408. In this example, the document object 204 calls the add entry command via the browser's IOleCommandTarget::ExecCommand(OLECMDID_ADDTRAVELENTRY) interface. This prepends an entry at a current offset in the travel log.

Thereafter, in this example, the browser 202 calls QueryInterface on the currently hosted document object 204 to obtain a pointer to the document objects's ITravelLogClient interface (unless already known). With the interface, the browser 202 calls ITravelLogClient.GetWindowData. More particularly, the document object 204 stores some state information in a WINDOWDATA structure passed in with the call, including URL, Title, and a unique identifier to represent this information in the application. An example WINDOWDATA structure is set forth below:

---

```
typedef struct _WINDOWDATA
{
    DWORD dwWindowID;
    UINT uiCP;
    LPITEMIDLIST pidl;
    /* [string] */ LPOLESTR lpszUrl;
    /* [string] */ LPOLESTR lpszUrlLocation;
    /* [string] */ LPOLESTR lpszTitle;
} WINDOWDATA;
typedef WINDOWDATA *LPWINDOWDATA;
```

---

The window data includes a window identifier, a unique (at least unique per document object) for identifying the travel entry. Note that a page may have frames, and a user may navigate within a frame, with travel entries to be added to the travel log. The window identifier allows the browser 202 to track which frame navigation applies. A URL, URL location, and title (a friendly name for displaying the travel entry) are also provided to the browser 202 via the structure. Other information may include a code page of locale-specific information that the document object 204 may want to provide and persist with the entry, and a pathname or item ID list (PIDL) such as to represent a resource. In essence, although not specifically shown in the example window structure, the present invention allows any information that the document object 204 wants the browser 202 to persist and return, as identified via the document object's class identifier (CLSID, described below) and the WindowID. An example of such additional information may comprise scrolling/position data, by which the document object 204 can scroll to restore the correct position when a window or frame is navigated to by the user.

The browser 202 also calls QueryInterface for to obtain the document object's IPersist interface, and when received, calls a GetPersistID method to save the class identifier (CLSID) of the document object 204 in a TravelEntry location. As described below, whenever navigating to a document object, the CLSID may be used to match the document object with its own entries (sub-navigations) in the travel log, so that only top-level locations and the current page's sub-navigations are available for navigation to the user. In this implementation, the CLSID is used as a filtering mechanism. Note that it would also be feasible to track sub-navigations in a separate list for each class identifier, and then merge the list for the currently hosted document object with any top-level entries to provide the list to the user.

For a consistent user experience, upon adding an entry or navigating to an entry, the document object 204 may choose to automatically update the browser's address bar 214 (FIG. 2). Also, the browser 202 and hosted document object communicate via various navigation events to keep each other synchronized; note that the document object 204 may have its own internal toolbar that allows navigation, whereby without communication, the browser 202 may not otherwise know of such a navigation event.

Figure 5:
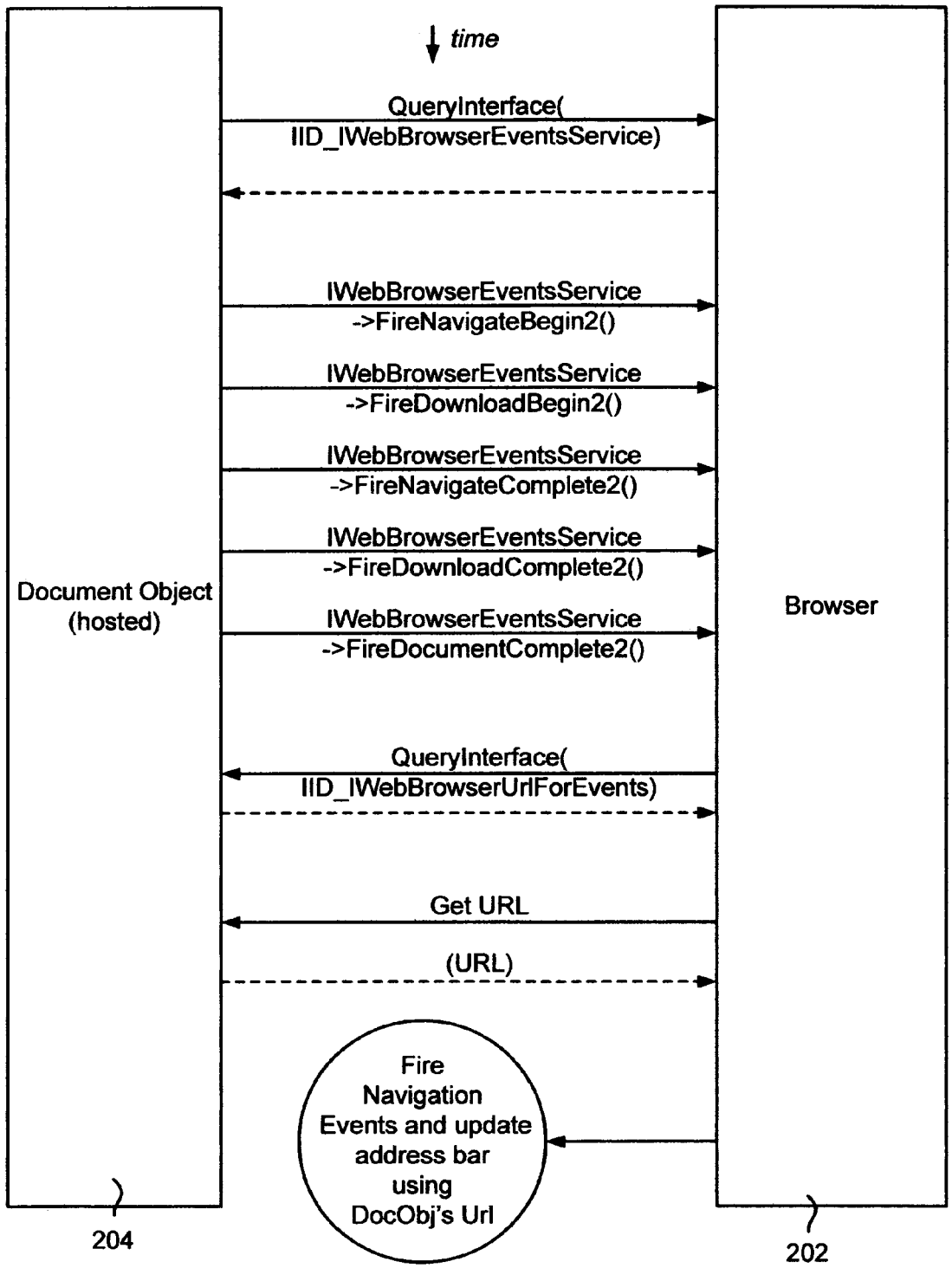
FIG. 5 is a sequence diagram representing communications between the browser and the hosted document object to fire navigation events and update the browser address bar, in accordance with various aspects of the present invention.

FIG. 5 is a general representation of how the communication works to update the address bar and fire navigation events. In general, the document object 204 queries the browser 202 for a WebBrowserEventsService interface pointer, and uses the pointer to call methods to fire NavigateComplete, DocumentComplete, DownloadComplete and other events. For example, the document object 204 may send a number of different events to notify the browser 202 of user-generated activity, such as a BeforeNavigate event that specifies the URL or path of the new location and any other data. After it has navigated to a new location, the document object 204 may send a NavigateComplete event. When downloading data, a DownloadBegin event is also sent, with a matching DownloadComplete event upon completion; (note that there may be multiple downloads, each with its own begin and complete event, although only one is shown in FIG. 4). A DocumentComplete event is also sent when all navigation and downloading finishes.

The browser 202 also queries the currently hosted document object 204 for interface pointers for sending events thereto, using a method:

STDMETHODIMP GetUrlForEvents([out] BSTR* pUrl);

The browser 202 also queries the document object 204 for the URL to display in the address bar for security mitigation.

In this way, the URL is obtained only from the currently hosted document server, to prevent address bar spoofing.

One way that a user can navigate is by clicking on the down arrow button that is adjacent the back and forward buttons; doing so results in a dropdown list of entries. In keeping with the present invention, however, the list is filtered to top-level entries and only those relevant to the current page. To this end, the entries in the travel log that are rendered to the user in the dropdown list are essentially the top-level entries, plus those sub-navigation entries that are filtered based on the CLSID of the current document object.

Figure 6:
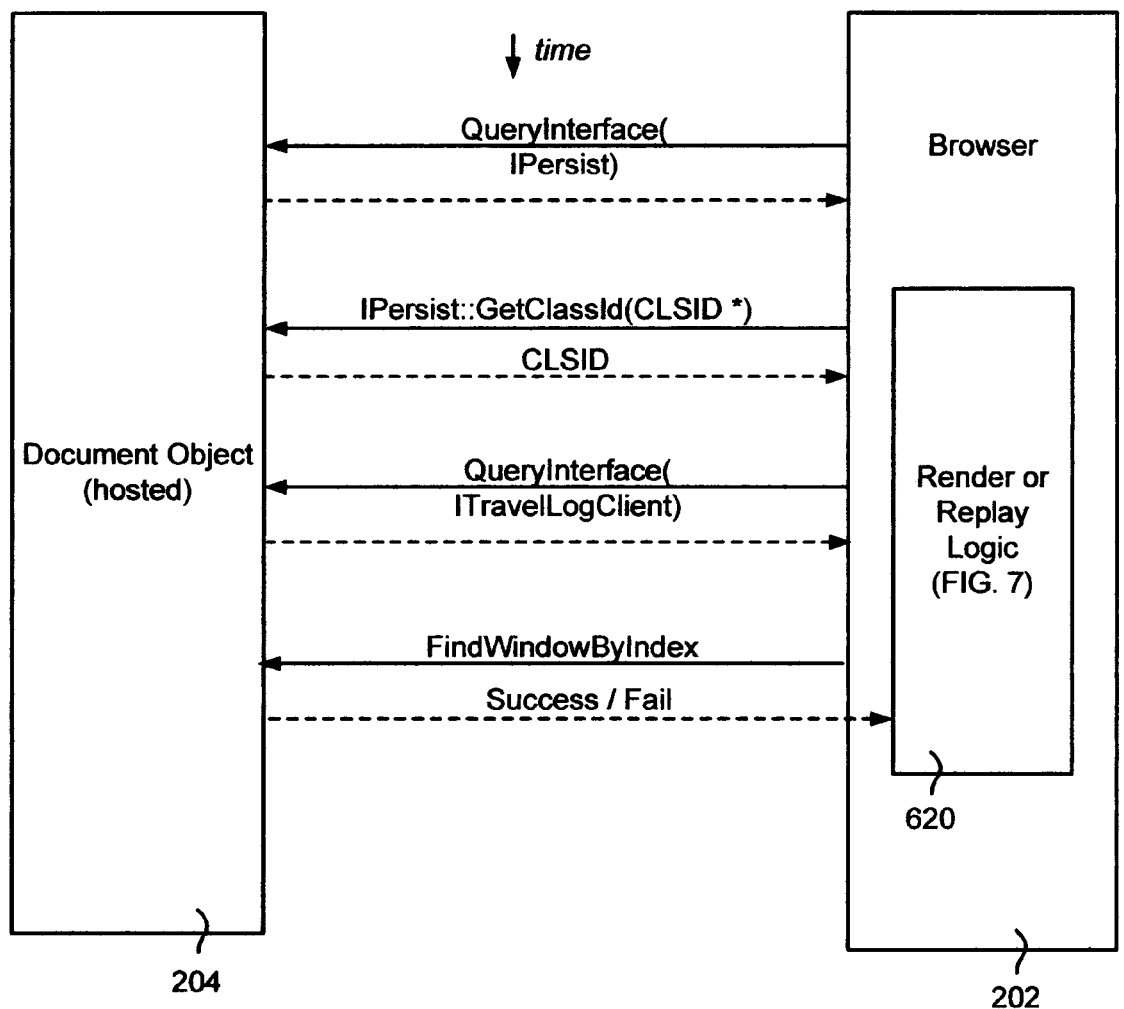
FIG. 6 is a sequence diagram representing communications between the browser and the hosted document object to determine whether to replay or render a window, in accordance with various aspects of the present invention.
Figure 7:
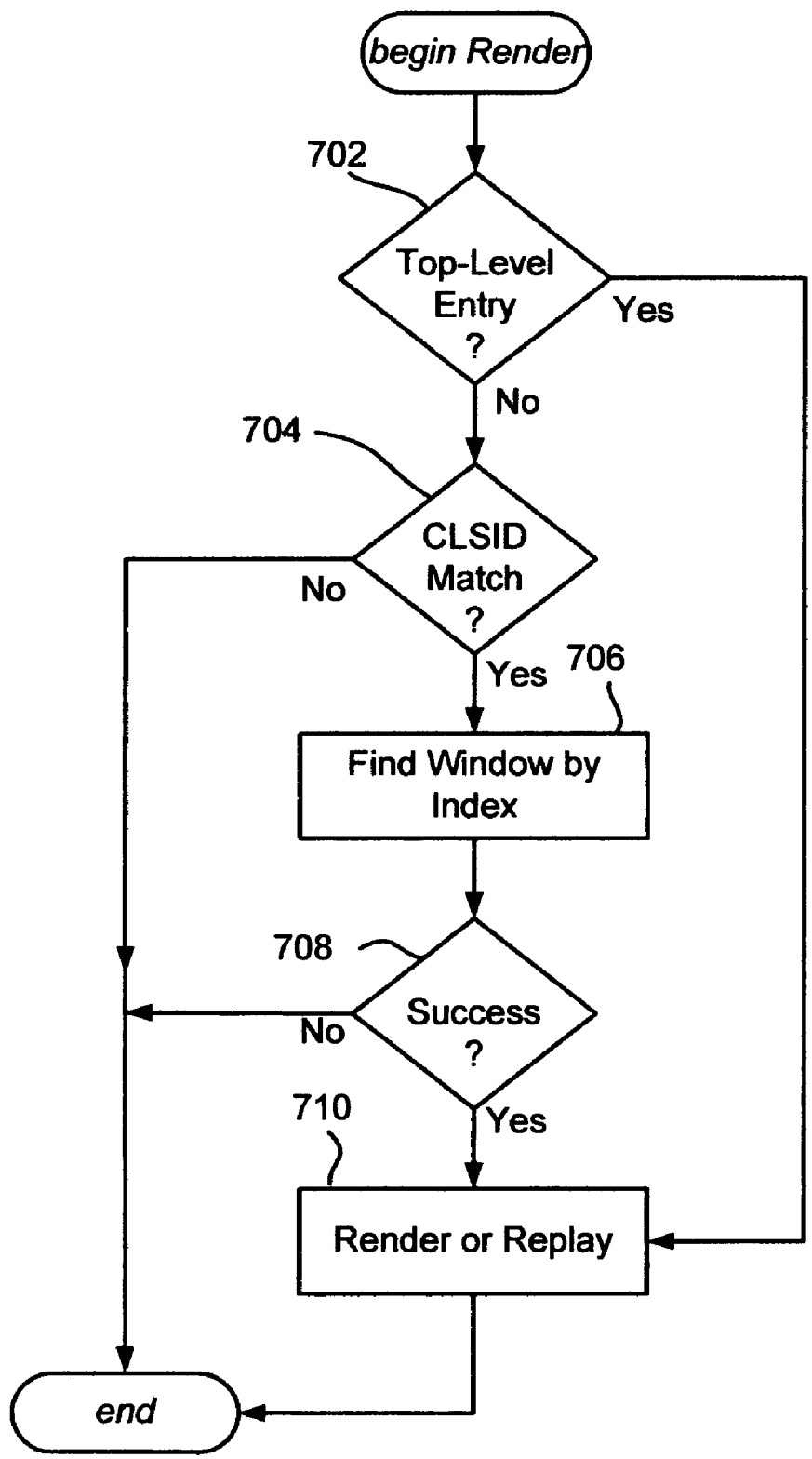
FIG. 7 is a flow diagram representing example logic used when determining whether to replay or render a window, in accordance with various aspects of the present invention.

FIGS. 6 and 7 provide an example explanation of one way that filtered rendering works. In general, when the dropdown list needs to be populated and rendered, the browser 202 calls the document object 204 for an appropriate interface pointer, which it then uses to obtain the CLSID of the document object 204, as generally represented in FIG. 6. The CLSID is then evaluated for a match; if there is no match, only the top-level entry will be rendered for this hosted object. If there is a match, for each window associated with that CLSID, the browser 202 queries for whether that window is still valid to the document object 204. For example, a frame that was formerly valid may have been removed by a user action.

FIG. 7 shows the general rendering logic 620 (FIG. 6) that decides whether an entry should be rendered. As described above, for a given entry, if the entry is a top-level entry (e.g., having a special window ID) as evaluated at step 702, the entry (its title) is rendered in the list, as represented by step 710. If not a top-level entry, step 704 represents evaluating whether there is a match with the CLSID, that is, whether the entry being evaluated belongs to the current document object 204. If not, this entry will not be rendered because it is a sub-navigation of another document object.

If there is a match with the CLSID of the current document object 204, the window is evaluated to see if it is still valid, by passing the Window ID to the document object 204 (step 706) and evaluating the returned success or failure at step 708. Step 710 represents the rendering. As can be readily appreciated, the travel log may be traversed using this logic to filter out sub-navigation entries of other document objects and include those of the current document object 204.

With respect to clicking the back and forward buttons, essentially the browser 202 moves back or forward in the travel log stack to select an entry. Essentially, the logic is the same as in FIG. 7; if not a top-level travel entry, the browser 202 checks if the CLSID of the corresponding travel entry in the appropriate direction matches the CLSID of the current document object 204. If the CLSID's match, the browser 202 calls the document object's ITravelLogClient.FindWindow-ByIndex method, passing in the unique ID stored by the document object 204. If an entry with that unique ID can be invoked, that is, the window is still valid, the document object 204 returns success (e.g., its IUnknown interface).

Figure 8:
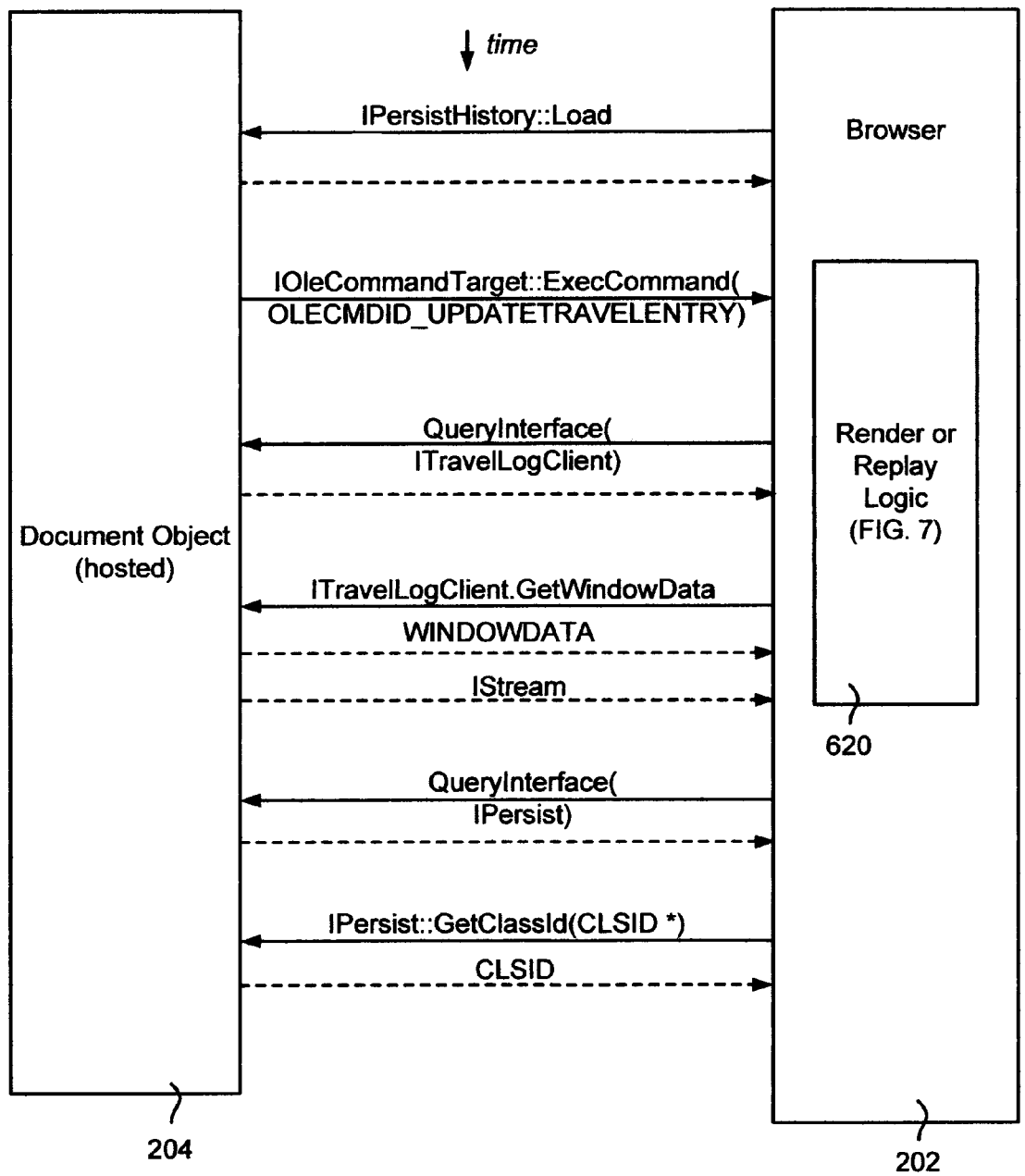
FIG. 8 is a sequence diagram representing communications between the browser and the hosted document object when replaying a window upon receiving a navigation command, in accordance with various aspects of the present invention.

FIG. 8 represents the further steps taken for replay, whether by the Back or Forward commands, or when the selects an entry via the dropdown list. The browser 202 calls the document object's IPersistHistory::LoadHistory with the stream stored in the WINDOWDATA structure. The document object 204 then processes the history navigation using the stream data, such as to restore the window to its preserved state. Note that if previously provided by the document object 204, the browser 202 may also return position data (LoadHistoryPosition) to the document object, such as to scroll the window to its previous location.

The document object 204 may asynchronously call the browser's IOleCommandTarget::ExecCommand(OLECMDID_UPDATETRAVELENTRY) to update the previous entry's state. The browser 202 queries the currently hosted document object 204 for ITravelLogClient. The browser 202 calls ITravelLogClient.GetWindowData and also queries for the IPersist interface. The browser 202 then calls GetClassID and saves the CLSID of the document object 204 in a travel entry.

Note that providing the state back to the document object 204 allows a user to undo actions. For example in the car selection scenario described above, when selecting a car, the user add another model X2 from the brand XX and then hit the back button to go back to the previous selection.

More particularly, in addition to navigating between pages in the same document, applications can also integrate with the travel log to add travel entries that reflect different states of the application. Continuing with the car selection example, if an application lets a user select different car models and accompanying features for a car including color, this information can be saved, essentially as a snapshot in the travel entry. The user can choose to save multiple such entries, and go back and forth between them to compare the different options. This enhances the user experience provided by both the application and the browser.

With respect to deleting entries, the document object 204 queries the browser 202 for a public ITravelLogStg interface, and may use existing RemoveEntry APIs. Moreover, the API's deletion mechanism is able to delete one or all of the travel entries related to a document object, based on a CLSID passed to the API. Alternatively, the document object 204 can instead return false when queried during travel entry filtering.

As can be seen from the foregoing detailed description, there is provided a method and system for seamless navigation of pages within hosted document objects. By allowing document object integration with the travel log, and by selective filtering, the present invention allows the user to navigate within hosted documents using the browser's user interface mechanisms, including Back and Forward commands and a dropdown list of entries, to match users' expectations and provide users with a consistent navigation experience.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method by which a document object hosted by a browser may integrate with the browser's travel log, the method comprising:

receiving a query from the document object by a browser for an interface pointer for the document object to send events to the browser;

the browser sending a query to the document object for an interface pointer for the browser to send events to the document object;

receiving by the browser an event comprising a travel entry from the document object;

adding the travel entry to a travel log;

navigating to the travel entry via a browser command;

filtering sub-navigation entries based on the document object to replay a sub-navigation entry that corresponds to the document object and not a sub-navigation entry that corresponds to another document object; and querying the document object to determine whether a sub-navigation window is still valid to replay.

2. The method of claim 1 further comprising returning state information corresponding to the sub-navigation entry to the document object.

3. The method of claim 1 further comprising, displaying at least some of a plurality of entries in the travel log.

4. The method of claim 1 wherein receiving the travel S entry comprises receiving a top-level entry that is selectively displayable including when the document object is not hosted by the browser.

5. The method of claim 4 further comprising, querying the document object to determine whether a sub-navigation window is still valid to display an entry for that window.

6. The method of claim 1 further comprising, updating the address bar based on the travel entry being added.

7. The method of claim 6 further comprising, querying the document object to obtain an address for an address bar of the browser.

8. The method of claim 1 further comprising, deleting at least one entry in the travel log related to the document object based on an identifier of the document object.

9. The method of claim 1 wherein the event comprising a travel entry further comprises a unique identifier.

10. The method of claim 1 wherein the travel entry comprises a top-level entry comprising information to restore an application to a state represented in the entry.

11. The method of claim 1 wherein adding the travel entry comprises prepending the entry at a current offset in the travel log.

12. The method of claim 1 further comprising automatically updating the browser's address bar upon adding the travel entry.

13. The method of claim 1 further comprising the document object and the browser communicating via navigation events to keep each other synchronized.

14. The method of claim 1 wherein the event comprising a travel entry further comprises a notification of user-generated activity.

15. The method of claim 1 further comprising the browser querying the document object for a URL to display in an address bar.

16. The method of claim 1 wherein the travel entry comprises a state and the method further comprising receiving an asynchronous call from the document object to update the travel entry's state.

17. At least one computer-readable storage medium having computer-executable instructions, which when executed perform a method comprising:
receiving a query from the document object by a browser for an interface pointer for the document object to send events to the browser;
the browser sending a query to the document object for an interface pointer for the browser to send events to the document object;
receiving by the browser an event comprising a travel entry from the document object;
adding the travel entry to a travel log;
navigating to the travel entry via a browser command;
filtering sub-navigation entries based on the document object to replay a sub-navigation entry that corresponds to the document object and not a sub-navigation entry that corresponds to another document object; and
querying the document object to determine whether a sub-navigation window is still valid to replay.

18. In a computing environment system comprising a computer processor and computer-readable memory, the system comprising:
a browser having a travel log;
means for hosting a document object in the browser;
means for adding a set of at least one navigation entry provided by the document object to the travel log, wherein the set contains a sub-navigation entry, the means for adding comprising
means for receiving a query from the document object by the browser for an interface pointer for the document object to send events to the browser;
means for the browser sending a query to the document object for an interface pointer for the browser to send events to the document object; and
means for the browser receiving one or more events from the document Object; and
means for relating the set to the document object currently being hosted, to prevent navigation via a travel log entry to a sub-navigation that does not correspond to the document object.

19. The system of claim 18 wherein the means for adding the set comprises a set of defined interfaces.

20. The system of claim 19 wherein the browser, document object and interfaces are based on component object model (COM) technology.

21. At least one computer-readable storage medium for a document object hosted by a browser to integrate with the browser's travel log, the medium having computer-executable instructions, which when executed perform steps, comprising:
receiving a query from the document object by the browser for an interface pointer for the document object to send events to the browser;
the browser sending a query to the document object for an interface pointer for the browser to send events to the document object;
receiving a travel entry from the document object wherein the travel entry comprises a sub-navigation entry of a plurality of sub-navigation entries corresponding to the document object;
navigating to that travel entry via a browser command; and
querying the document object to limit sub-navigation to only windows that are currently valid.

22. The computer-readable storage medium of claim 21 wherein the travel entry comprises a sub-navigation entry of a plurality of sub-navigation entries corresponding the document object, and having further computer-executable instructions comprising, preventing browser navigation to a sub-navigation entry corresponding to a different document object.

23. The computer-readable storage medium of claim 21 having further computer-executable instructions comprising, querying the document object to obtain an address for an address bar of the browser.

24. The computer-readable storage medium of claim 21 having further computer-executable instructions comprising, communicating navigation events between the browser and the document object.

* * * * *